(12) United States Patent
Peng

(10) Patent No.: US 6,549,507 B1
(45) Date of Patent: *Apr. 15, 2003

(54) APPARATUS WITH RING SHAPE SLEEVES

(75) Inventor: Li-Chung Peng, Hsin-Chu (TW)

(73) Assignee: Acute Applied Technologies, Inc., Taipei (TW)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/330,054

(22) Filed: Jun. 11, 1999

(51) Int. Cl.⁷ ............................................. G11B 21/16
(52) U.S. Cl. ..................................... 369/244
(58) Field of Search ................. 369/244, 176, 369/44.21, 44.22, 44.1 J; 359/814–825

(56) References Cited

U.S. PATENT DOCUMENTS

| 4,014,596 | A | * | 3/1977 | Kazama ..................... 384/207 |
| 4,473,274 | A | * | 9/1984 | Yano et al. .............. 369/44.15 |
| 4,504,935 | A | * | 3/1985 | Jansen ..................... 369/44.16 |
| 4,792,245 | A | * | 12/1988 | Fuke et al. ................. 384/610 |
| 4,796,245 | A | * | 1/1989 | van Alem et al. ........ 369/44.21 |
| 4,866,690 | A | * | 9/1989 | Tamaru et al. ................. 369/14 |
| 5,354,531 | A | * | 10/1994 | Gumbert ..................... 264/242 |
| 5,441,349 | A | * | 8/1995 | Shimizu ..................... 384/276 |
| 5,592,459 | A | * | 1/1997 | Kasahara ..................... 369/112 |
| 5,740,150 | A | * | 4/1998 | Uchimaru et al. .......... 369/119 |
| 5,745,466 | A | * | 4/1998 | Kasahara ..................... 369/118 |

FOREIGN PATENT DOCUMENTS

GB    2119869    * 11/1983

* cited by examiner

Primary Examiner—William Korzuch
Assistant Examiner—Angel Castro
(74) Attorney, Agent, or Firm—Bacon & Thomas

(57) ABSTRACT

An apparatus with ring shape sleeve is provided. The apparatus is attached to a shaft and moves around the shaft, the varieties of the apparatus comprise objective lens holder of pick-up head. The characteristic of the invention is that apparatus and shaft are attached by ring shape sleeves where not only thickness of any ring shape sleeve is thin enough such that draft angle effect is negligible but also ring shape sleeve can be inlayed in the apparatus or be molded integrally with the apparatus. Therefore, not only shaft and apparatus are rigorously attached but also the space between shaft and apparatus is significant decreased. Thus, dynamic behavior of the apparatus is more controllable and yield of the apparatus is improved.

10 Claims, 4 Drawing Sheets

APPARATUS WITH RING SHAPE SLEEVES

BACKGROUND OF THE INVENTION

1. Field of the Invention

The present invention relates to an apparatus with ring shape sleeves, and is provided to improve all disadvantages that induced by the draft angle effect. Obviously, the invention is especially adaptable for high precision apparatus such as objective lens holder of optical pick-up head.

2. Description of the Prior Art

Apparatus which is attached to a shaft and moves about a shaft is widespread applied in modern industry. Such application comprises lens holder of rotating type actuator and emery wheel. Obviously, the tolerance between the shaft and other part of the apparatus is an important factor of quality of the apparatus. Generally, the less the tolerance is, the more controllable the apparatus is. No matter how, even the required tolerance is small, the determination of the real region of gap between shaft and apparatus is strongly dependent on how the apparatus is attached to the shaft.

Obviously, it is necessary to form a hole on the apparatus to attach the apparatus and the shaft. Conventional methods to form the hole comprise injection molding and lathe tuning. No matter how, owing to these restrictions of fabrication such as module and cutter should be removed from formed apparatus when the hole is formed, the width of the hole is not uniform. Referring to FIG. 1, when hole 10 is formed in apparatus 12 and module/cutter 14 is moved away, it is obvious that top width W+2δ must be larger than bottom width W or the remove of module/cutter 14 will damage boundary of hole 10. Specifically, there is a draft angle θ, and the variance of tolerance 2 δ is proportional to thickness of apparatus 12. Particularly, the draft angle effect is serious when thickness of apparatus 12 is large, and is more serious when aspect ratio of hole 10 is lager for the ratio 2 δ/W is not negligible in the case.

It is crystal-clear that when the draft angle effect is not negligible, the real region of gap between the shaft and apparatus is increased and apparatus can not rigorously reattached to the shaft. FIG. 1B shows the condition in that when shaft 16 penetrates hole 10, there is non-uniform gap 18 between shaft 16 and apparatus 12. Therefore, during operation of the apparatus, some disadvantage that induced by the draft angle effect such as lean of apparatus and degraded dynamical characteristics of apparatus will occur. When required accuracy of apparatus is not rigorous, these disadvantages maybe negligible. However, when the apparatus requires rigorous accuracy, such as objective lens holder of optical pick-up head, it is necessary to overcome all disadvantages that induced by the draft angle effect.

According to previous discussion, obviously in fabrication of apparatus that is attached to and move about a shaft, it is important to overcome disadvantages that induced by the draft angle effect. In addition, it is more desired for apparatus that requires rigorous accuracy such as objective lens holder of optical pick-up head.

SUMMARY OF THE INVENTION

The main object of the invention is to propose a method that rigorously attaches an apparatus to a shaft.

Another object of the invention is to decrease the tolerance and decrease difficulty of fabrication of the apparatus.

Another object of the invention comprises efficiently improves disadvantages that induced by the draft angle effect.

An incidental object of the invention is to eliminate any dust that appears in the gap between the apparatus and the shaft.

A further object of the invention is to increase interchangeable ability of component parts.

A specific object of the invention is to improve quality of objective lens holder of rotating type actuator.

Another specific object of the invention is to simplify the fabrication and the development of rotating type actuator.

In order to accomplish previous objects, apparatus with ring shape sleeves is proposed. One of the features of the proposed invention is that apparatus and shaft are attached by ring shape sleeves that thickness of any ring shape sleeve is thin enough such that the draft angle effect is negligible. Moreover, ring shape sleeves can be either inlayed in the apparatus or be molded integrally with the apparatus.

Therefore, not only shaft is rigorously attached to the apparatus but also the space between shaft and apparatus is significant decreased. In other words, draft angle effect is efficiently protected. By the way, the apparatus is more controllable and yield of the apparatus is improved. Beside, because the contact area between shaft and apparatus is small, any dust that appears between the apparatus and the shaft is eliminated.

BRIEF DESCRIPTION OF THE DRAWINGS

The foregoing aspects and many of the accompanying advantages of this invention will become more readily appreciated as the same becomes better understood by reference to the following detailed description, when taken in conjunction with the accompanying drawings, wherein.

DESCRIPTION OF THE PREFERRED EMBODIMENT

Figure 2:
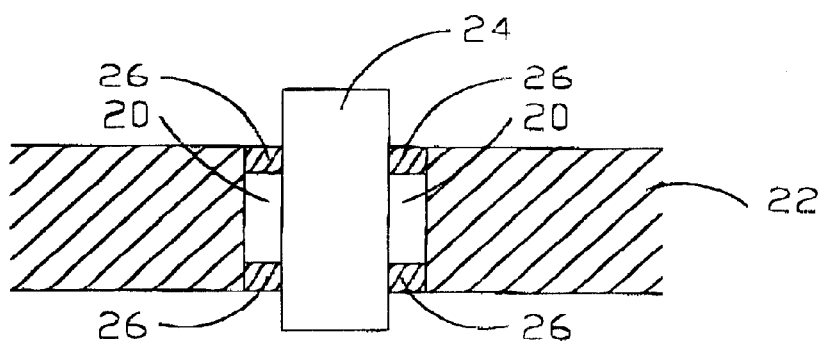
FIG. 2 is a diagram schematically illustrating the mechanism of how the draft angle effect is improved by ring shape sleeves according to the present invention.

In order to illustrate the mechanism of the invention, referring to FIG. 2 that hole 20 locates in apparatus 22 and hole 20 is penetrated by shaft 24. Moreover, apparatus 22 is formed by injection molding and hole 20 has a high aspect that at least is larger than 3. In addition, apparatus 22 comprises a holder which is used to load at least one device such as lens or milling cutter, and hole 20 locates in the holder. Beside, at least two ring shape sleeves 26 are located in boundary of hole 20 and closed to the holder where ring shape sleeves 26 are used to attach the holder to shaft 24 such that apparatus 22 moves about shaft 24. Motion of apparatus 22 comprises apparatus 22 slides along shaft 24 or apparatus 22 rotates around shaft 24. In general, possible material of ring shape sleeves 26 comprises metal and plastic.

No matter how, a significant characteristic of the invention is that ring shape sleeves 26 are used to join apparatus 22 and shaft 24. Moreover thickness of any ring shape sleeves 26 is thin enough to let the draft angle effect negligible and then cross-section area at everywhere inside hole 20 is almost a constant.

Figure 1A:
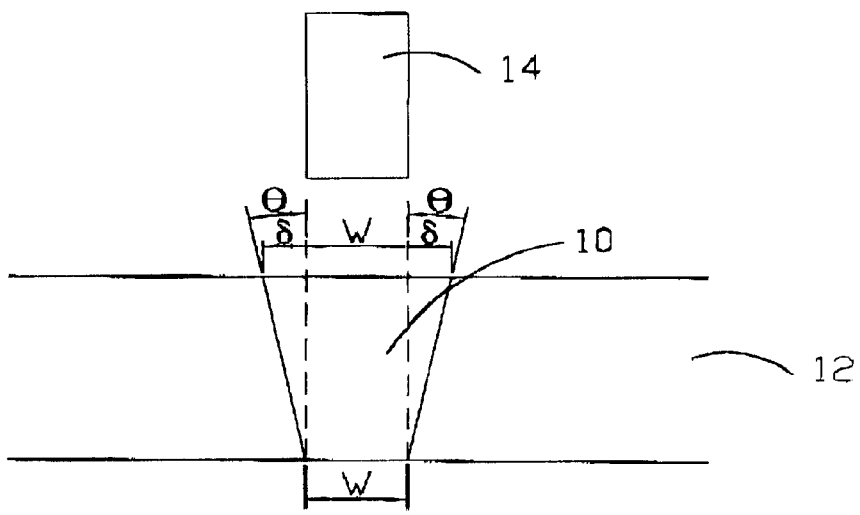
FIG. 1A and FIG. 1B are two diagrams that schematically illustrate the mechanism of draft angle effect with conventional fabrication.
Figure 1B:
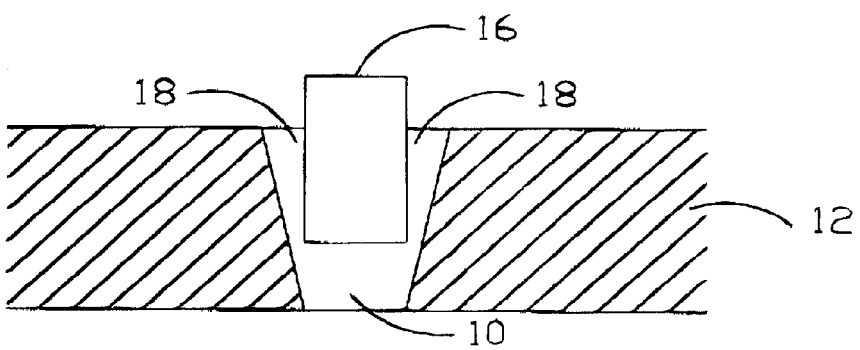

In comparison with conventional fabrication as FIG. 1B shows that apparatus 12 directly joins to shaft 16 and the contact region between apparatus 12 and shaft 16 is a cylinder. In the proposed invention apparatus 22 is joined to shaft 24 by ring shape sleeves 26 and the contact region between apparatus 22 and shaft 24 is several rings. Moreover, in most cases the inner diameter of any said ring shape sleeve 26 is almost equivalent to other ring shape sleeves. Therefore, there are at least following advantages:

First, because thickness of each ring shape sleeves 26 is thin enough to let the draft angle effect is negligible; the gap between sleeves 26 and shaft 24 is uniform and width of the gap is negligible. In other words, shaft 24 is rigorous attached to apparatus 22 by ring shape sleeves 26. Moreover, it means that all disadvantages that induced by the draft angle effect can be improved by the proposed invention.

Second, because apparatus 22 is rigorously attached to shaft 24 by sleeves 26, not only dynamical characteristics of apparatus 22 does not be degraded by the draft angle effect during operation of apparatus 22 but also lean of apparatus 22 is efficiently avoided.

Third, owing to the fact that the contact region between apparatus 22 and shaft 24 is formed by ring shape sleeves 26, the required precision of the proposed invention is the circular precision. It is crystal-clear that for same design tolerance between apparatus 22 and shaft 24, ring shape sleeves 26 is a better way to accomplish required tolerance than conventional cylinder contact region which is formed by injection molding, lathe tuning or other ways. Of course, owing to the fact that thin enough ring shape sleeves efficiently protect the draft angle effect, the difficulty of fabrication of the apparatus is efficiently improved. Therefore, manufacturing ability of the proposed invention is improved and is better than convention fabrication.

Figure 3A:
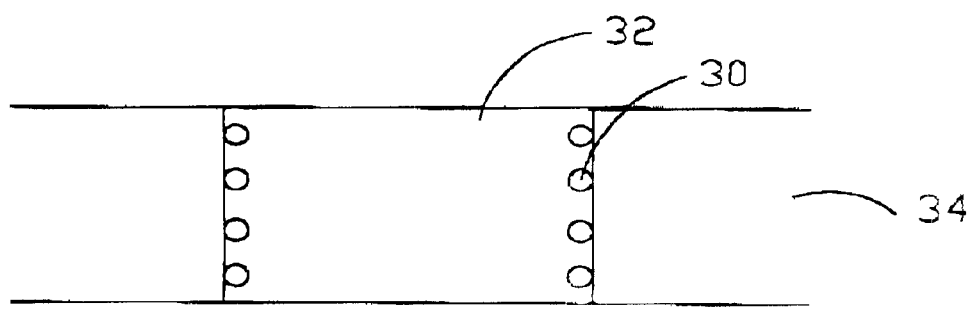
FIG. 3A to FIG. 3C illustrate the mechanism of how any dust that appears in the gap between the apparatus and the shaft is eliminated by the ring shape sleeve.
Figure 3B:
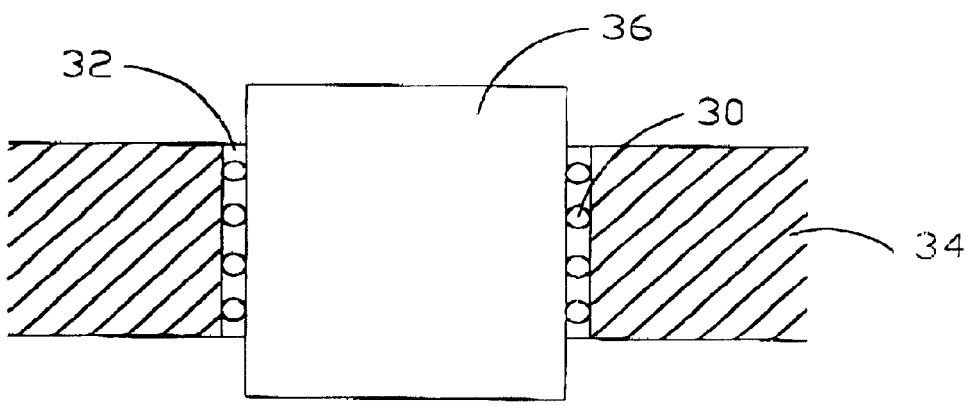
Figure 3C:
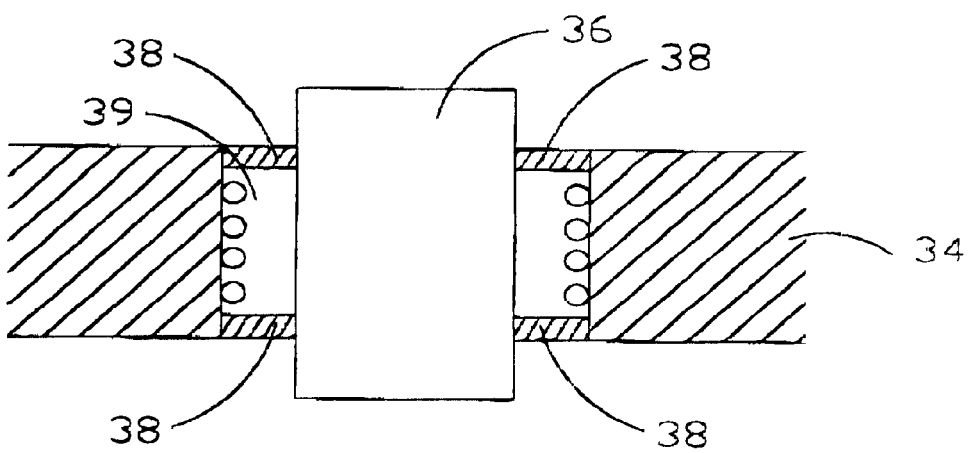

Fourth, because contact area between ring shape sleeves 26 and shaft 24 is obviously smaller than conventional cylinder contact area, then as FIG. 3A to FIG. 3C shows that any dust that appears in hole 20 will be eliminated by ring shape sleeves 26. FIG. 3A shows that there is some dust 30 appears in hole 32 that is inside apparatus 34. FIG. 3B shows that when apparatus 34 moves along shaft 36 with cylinder contact region, dust 30 is confined in the gap between apparatus 34 and shaft 36. Therefore, the interaction between apparatus 34 and shaft 36 is degraded by dust 30. FIG. 3C shows that when apparatus 34 and shaft 36 is joined by ring shape sleeves 38, because the contact area between apparatus 34 and ring shape sleeves 38 is obvious smaller than surface area of shaft 36, then ring shape sleeves 38 act as broom to sweep all dust 30 that appears is hole 32. Therefore, dust 30 either is eliminated or is located in depression 39 of hole 32 and the interaction between apparatus 34 and shaft 36 does not be degraded by dust 39 that locates between shaft 36 and ring shape sleeve 38.

Figure 3D:
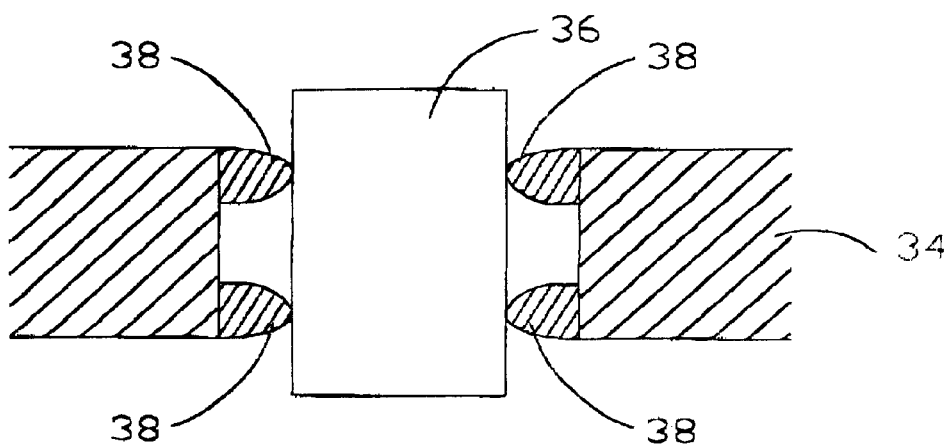
FIG. 3D to FIG. 3F show some possible amendments of this present invention.
Figure 3E:
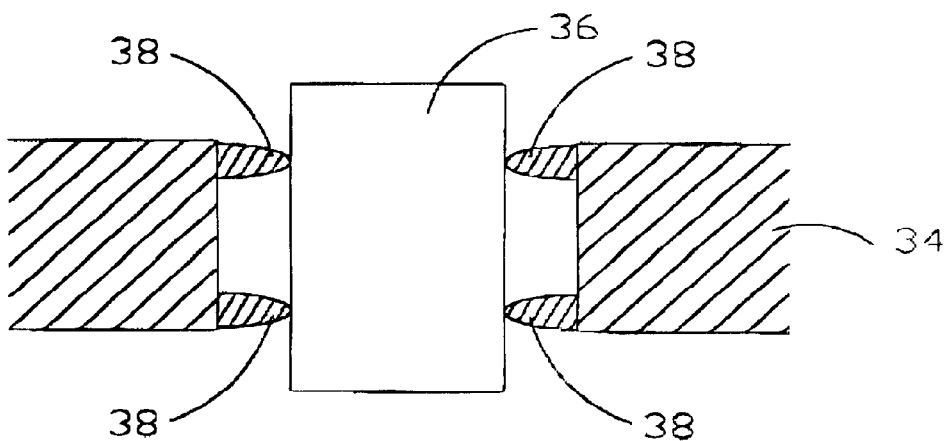
Figure 3F:
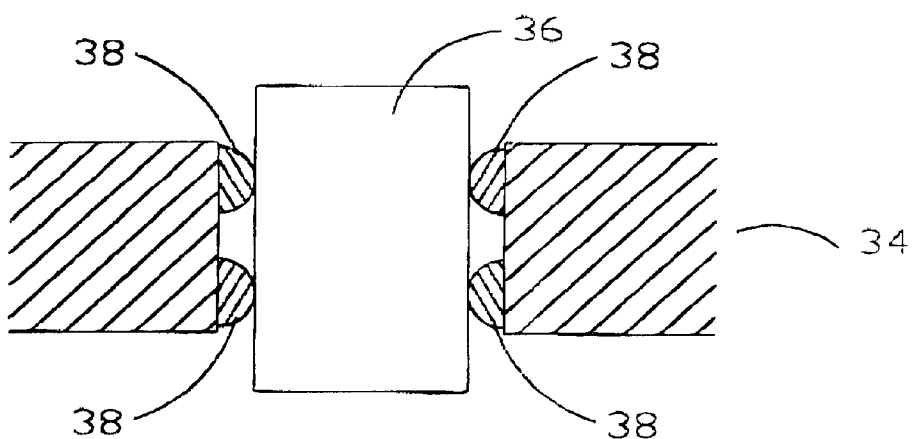

Finally, according to previous discuss and more particularly to the fourth advantage, it is obvious that not only decrease thickness of sleeves is adaptable for the draft angle effect is improved but also to decrease contact area between shaft and sleeve is adaptable is adaptable for dust is eliminated. Therefore, the cross-section shape of ring shape sleeve 38 does not confined in square, it further comprises curved bending surface, trapezoid and semi-circular, as shown in FIG. 3D to FIG. 3F.

Figure 4A:
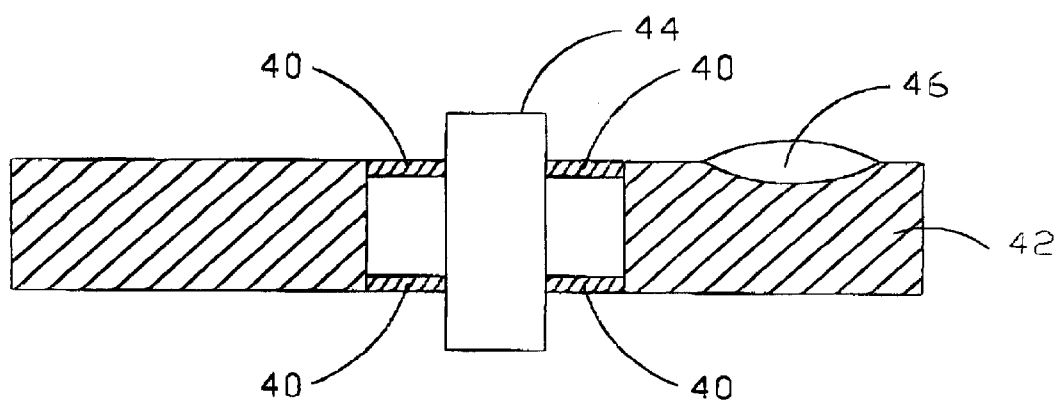
FIG. 4A to FIG. 4C schematically illustrate a preferred embodiment of the invention.
Figure 4B:
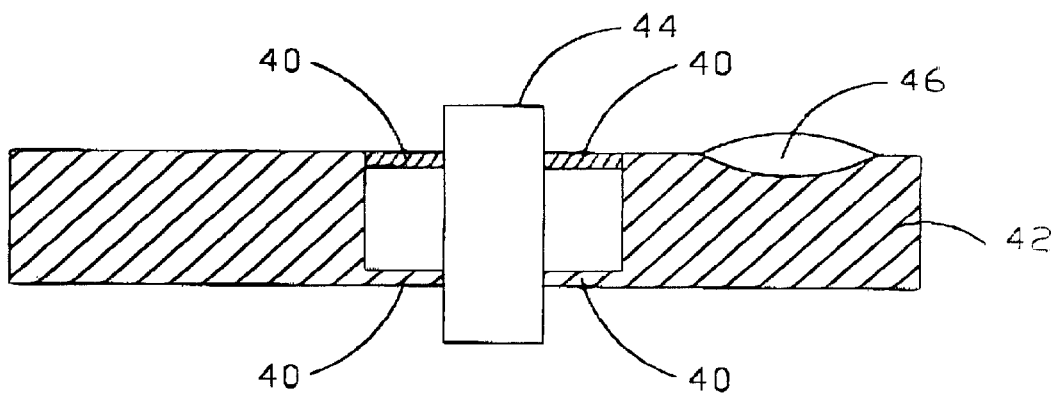
Figure 4C:
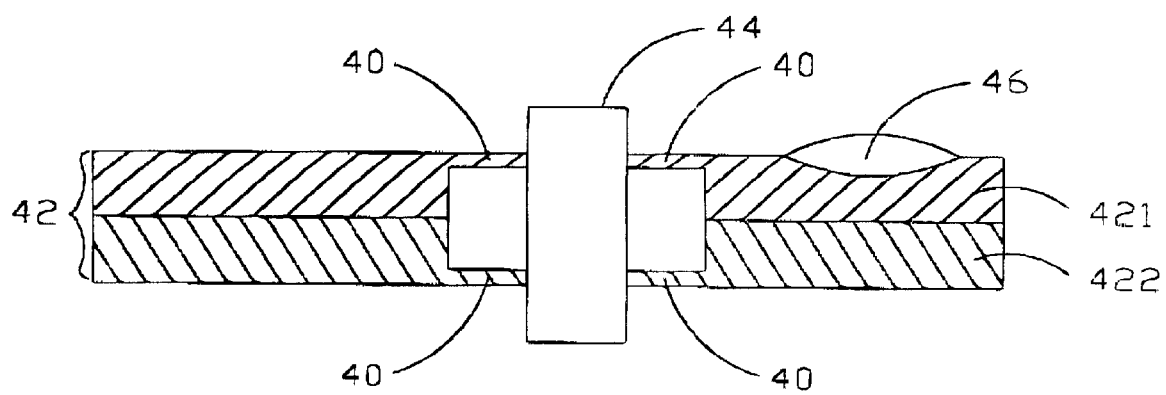

FIG. 4A to FIG. 4C schematically illustrate an embodiment of the invention where ring shape sleeves is used to rigorously join shaft and objective lens holder of rotating type actuator, where the rotating type actuator is widespread used in optical pick-up head of CD driver. In the embodiment two ring shape sleeves 40 are used to form interface between holder 42 and shaft 44 where objective lens 46 locates in holder 42, where and possible material of ring shape sleeves 40 comprises metal and plastic. Of course, there are other parts in holder 42 but they are omitted to simplify these figures.

FIG. 4A shows the case that both ring shape sleeves 40 are inlayed in holder 42 where thickness of ring shape sleeves 40 is thin enough to protect draft angle effect.

FIG. 4B shows the case that one ring shape sleeve 40 is inlayed in holder 42 and another ring shape sleeve 40 is molded integrally with holder 42.

FIG. 4C shows the case that holder 42 is formed by top holder 421 and bottom holder 422, where one ring shape sleeve 40 is inlayed in top holder 421 and another ring shape sleeve is inlayed in bottom holder 422.

Compare these three figures, it is obvious that the formation of ring shape sleeves 40 do not affect the shape and the effect of ring shape sleeves 40. In other words, because the essential point of the proposed invention is that interface between shaft 44 and holder 42 is formed by ring sleeves which is a significant difference with convention fabrication that the interface is formed by cylinder sleeves. Therefore, the formation of ring shape sleeves 40 is elastic, ring shape sleeves 40 can be inlayed in holder 42 or be molded integrally with holder 42 or be formed by other fabrication.

Beside, when ring shape sleeves 40 are inlayed in holder 42, shaft 44 never directly contacts with holder 42 and then size of shaft 44 does not sensitively depend on inner diameter of holder 42 expect that diameter of shaft 44 must be lower than inner diameter of holder 42. Therefore, same shaft 44 can be used to drive different holder 42 by using different ring shape sleeves 40, for example, same shaft 44 and same ring shape sleeves 40 can be used to drive holders that with different thickness. On the other hand, it is obvious that different shaft 44 can be used to drive same holder 42 by using different ring shape sleeves 40. Therefore, same holder 42 and same shaft 44 can be used in different actuator, and development of optical pick-up head is simplified by application of different ring shape sleeves 40. Conversely, same component parts can be used in different actuator and interchangeable ability of component parts is significant increased.

While the invention has been described by way of example and in terms of preferred embodiment, the invention is not limited there to. To the contrary, it is intended to cover various modifications, procedures and products, and the scope of the appended claims therefore should be accorded to the broadest interpretation so as to encompass all such modifications and similar arraignment, procedures and products.

What is claimed is:

1. An objective lens holder with ring shape sleeve, said objective lens holder comprising:

a holder used to load at least one objective lens, where a hole having a sidewall is located in said holder; and at least two ring shape sleeves that are located on the sidewall of said hole and are adjacent to said hole, wherein said ring shape sleeves use a shaft to penetrate said hole such that said objective lens holder moves about said shaft, wherein each said ring shape sleeve has a wider contacting area with said holder and a narrower contacting area with said shaft.

2. The objective lens holder according to claim 1, wherein said objective lens holder slides along said shaft.

3. The objective lens holder according to claim 1, wherein said objective lens holder rotates around said shaft.

4. The objective lens holder according to claim 1, wherein a thickness to said ring shape sleeve is thin enough such that a draft angle effect is negligible.

5. The objective lens holder according to claim 1, wherein an inner diameter of each of said ring shape sleeves is almost equivalent to an inner diameter of another of said ring shape sleeves.

6. The objective lens holder according to claim 1, wherein a cross-sectional shape of said ring shape sleeve is square.

7. The objective lens holder according to claim 1, wherein a cross-sectional shape of said ring shape sleeve is semicircular.

8. The objective lens holder according to claim 1, wherein said ring shape sleeve includes a curved bending surface.

9. The objective lens holder according to claim 1, wherein a cross-sectional shape of said ring shape sleeve is trapezoidal.

10. The objective lens holder according to claim 1, wherein a cross-sectional area of said hole is almost a constant everywhere inside said hole.

* * * * *